Figure 1:
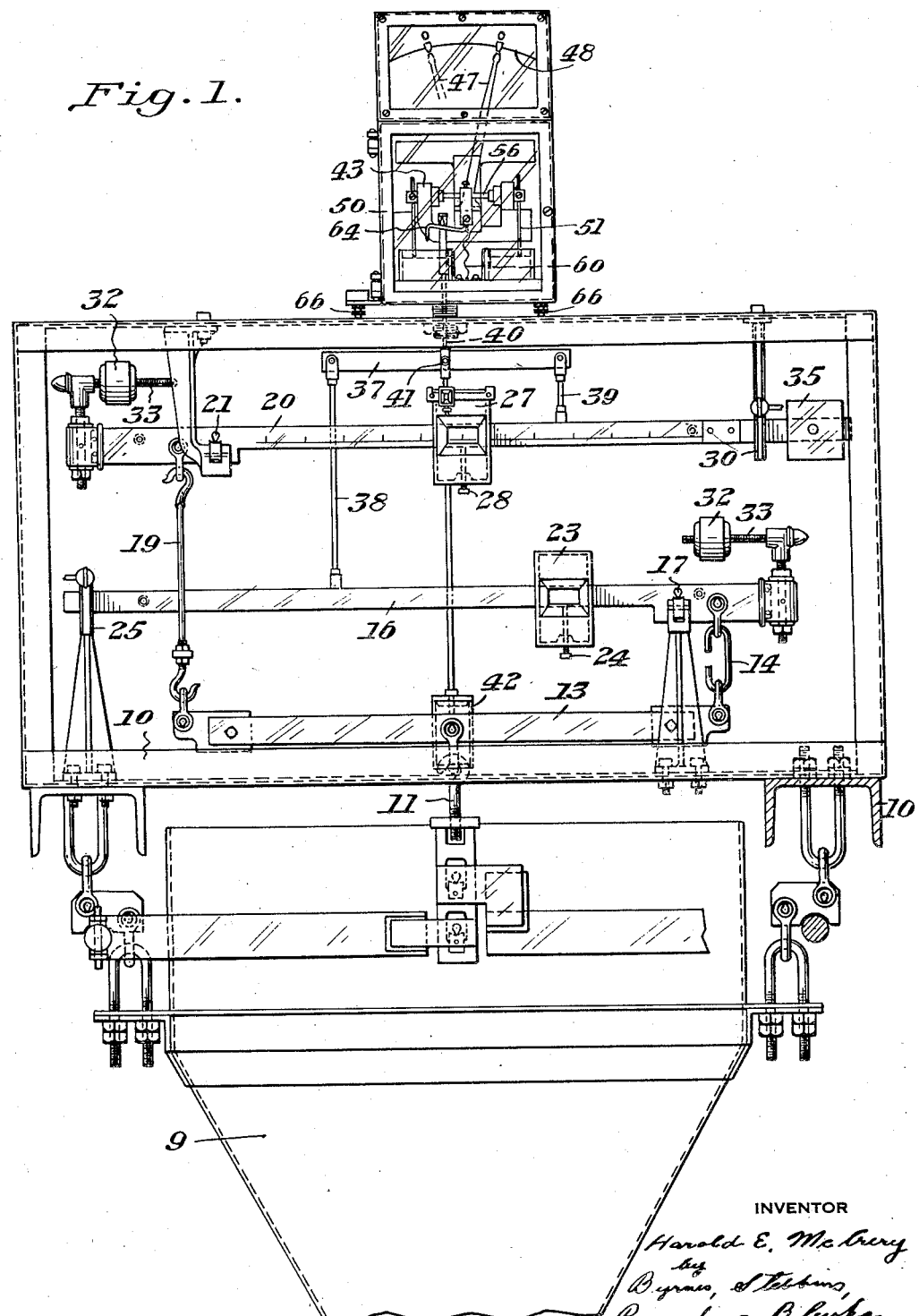

Oct. 23, 1934.  H. E. McCRERY  1,978,215
INDICATOR FOR SCALES
Filed Jan. 31, 1933  4 Sheets-Sheet 1

INVENTOR
Harold E. McCrery
by
Byrnes, Stebbins,
Parmelee & Blenko
His Attys.

Oct. 23, 1934.     H. E. McCRERY     1,978,215
INDICATOR FOR SCALES
Filed Jan. 31, 1933     4 Sheets-Sheet 3
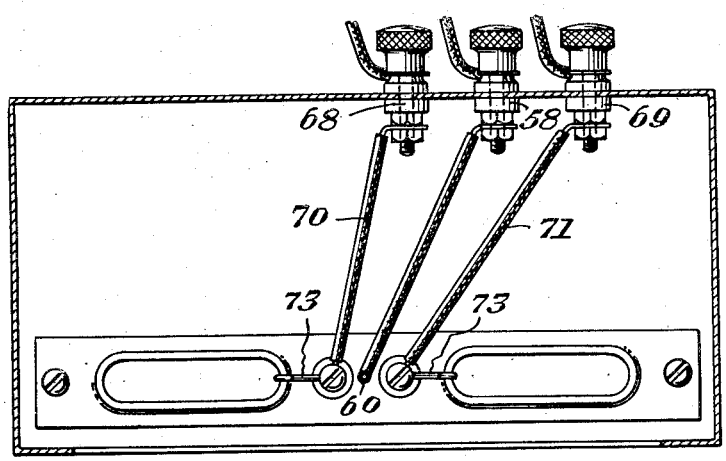
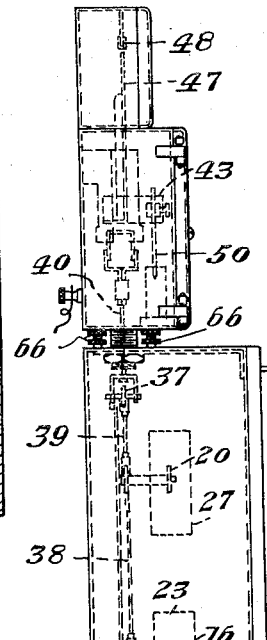
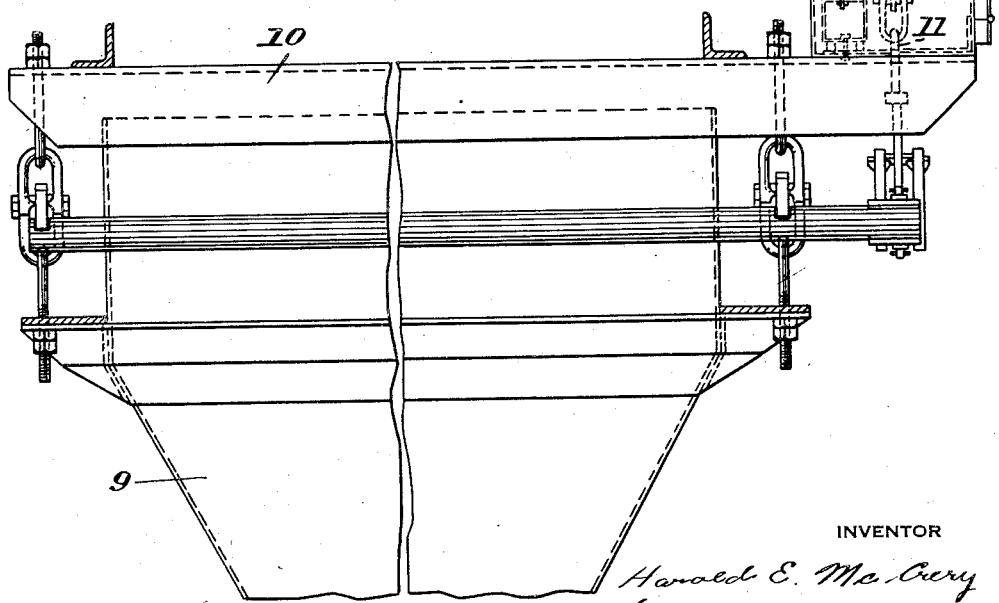
INVENTOR
Harold E. McCrery
by
Byrnes, Stebbins, Parmelee & Blenko
His Attys

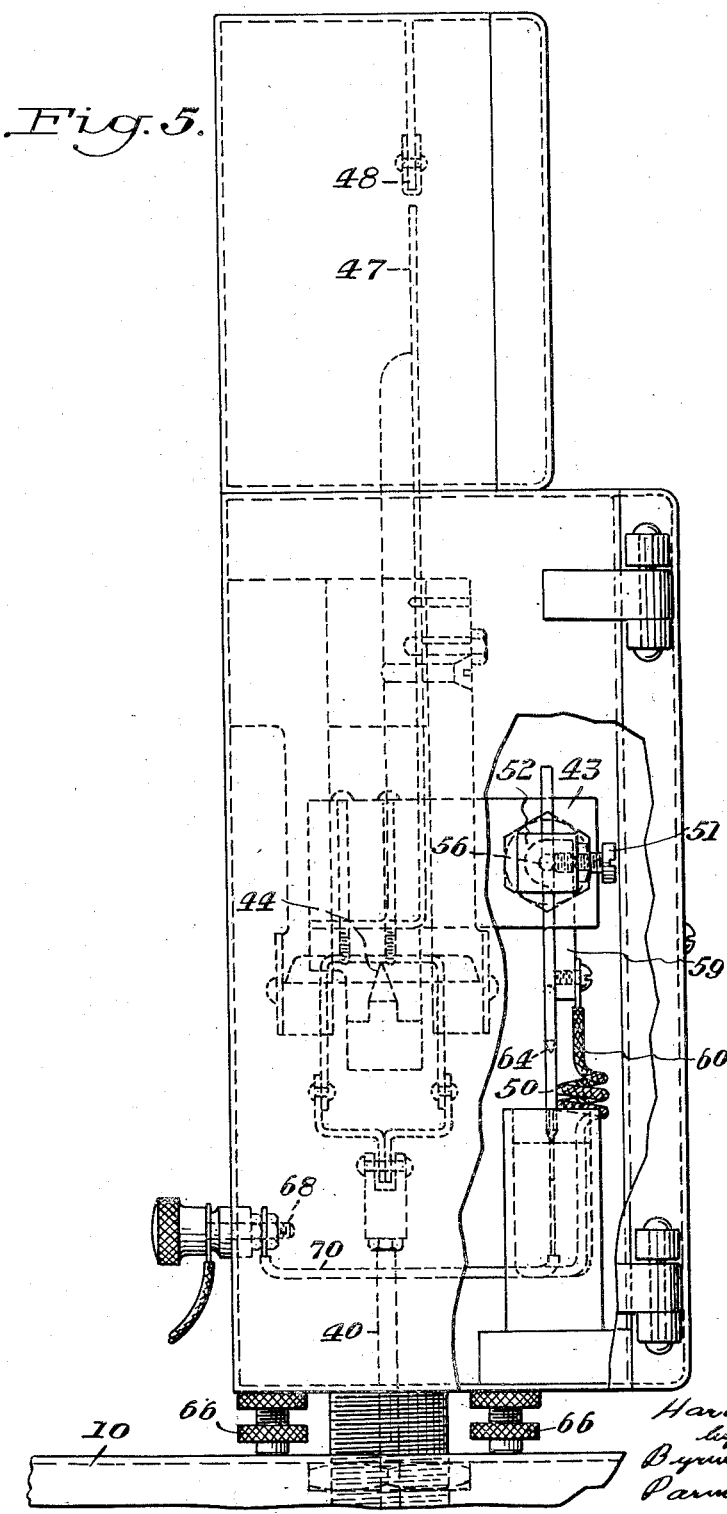

Patented Oct. 23, 1934

1,978,215

UNITED STATES PATENT OFFICE 1,978,215

INDICATOR FOR SCALES

Harold E. McCrery, Pittsburgh, Pa., assignor to Blaw-Knox Company, Blawnox, Pa., a corporation of New Jersey Application January 31, 1933, Serial No. 654,385

14 Claims. (Cl. 265—58)

This invention relates to a device for indicating to an operator when the scale hopper is empty, and when the scale hopper contains the correct amount of material.

In accordance with my invention, an indicating device of this character is connected to a scale of the well known two-beam type. The connections are made in such a manner that one indicator element is actuated by two beams, such actuation being so organized as to indicate by one position of the indicator when the weighing hopper is empty, and by another position when the hopper contains any desired weight of material for which the weighing scales may be set. A further feature of my invention resides in the provision of devices for making or breaking electrical contacts for closing circuits by which relays or other devices may be operated at such times as the indicator designates that the scale hopper contains the desired weight of material, or is completely empty. The precise nature of the apparatus operated by such circuits, or its purpose, is not a part of this invention. A variety of purposes may be served, such as the registering of each filling and emptying of the hopper at a distance. The chief use to which I have as yet put the electric circuits established by the device, is through the intermediary of relays, to control mechanism for filling and emptying the weighing hopper so that the discharge outlet cannot be opened unless precisely the weight which the scales are set to register is contained in the hopper, nor the filling mechanism started unless the weighing hopper is completely empty.

There is shown in the drawings only so much of the weighing hopper and scale beams as is necessary for an explanation of the new features of the indicator.

The device constructed in accordance with my invention may be applied to a scale with two weigh beams used for indicating overweight and underweight for both the full hopper and the empty hopper. Such a scale is well known in the art; and is not per se claimed as my invention.

Figure 2:
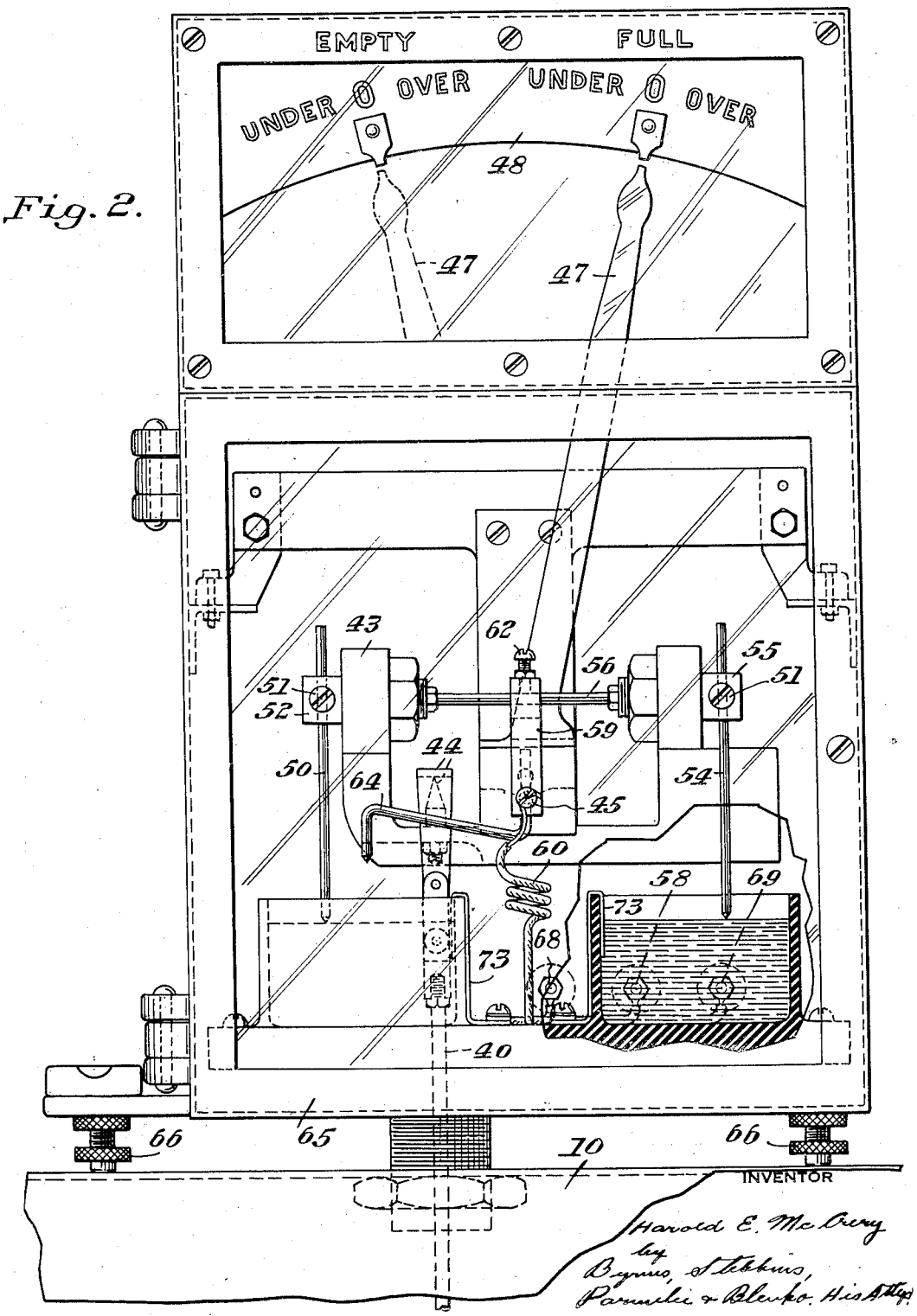

In the drawings in which for the purpose of illustrating my invention and not as limiting the same, I have shown one embodiment which my invention may assume, Fig. 1 is a view principally in side elevation of a two-beam scale provided with an indicating device whereby the operator may determine when the hopper is completely empty, and when the precise predetermined load has been deposited in the hopper, Fig. 2 is a detail view principally in elevation, but with parts broken away, of the indicating device shown in Fig. 1, Fig. 3 is an end view of the apparatus shown in Fig. 1, Fig. 4 is a plan view of the mercury contacts forming part of the indicating device shown in Fig. 2, and Fig. 5 is a view in end elevation of the indicating device shown in Fig. 2.

In Figs. 1 and 3 is illustrated a scale of the well known two-beam type. Supported within the lower part of the structure of the scale is a hopper 9 whose weight is partly sustained by the framework 10 of the scale and partly by the hook 11. In a manner which is well known in the art, the construction is so arranged that a certain percentage of the total weight of the material and the hopper 9 is imposed through the hook 11 upon the floating lever 13. In the particular scale selected for illustration, the hook 11 applies the load (by way of knife edges) to the middle of the lever 13, half of such load being applied through a link mechanism 14 to the lever 16, the point of application being to the right of the fulcrum or knife edge 17. The other half of the load is applied through the linkage 19 to the lever 20. Here, the point of application (by way of knife edges) is to the left of the fulcrum or knife edge 21.

Each of the levers or beams 16 and 20 carries a weight movable along the respective beam to cause the beam to move to balancing position when the predetermined condition as to load for the respective beam exists in the hopper. The lever 16, for instance, carries a weight 23 which may be fixed in adjusted position by a set screw 24. The end of the lever on the other side of the fulcrum from the linkage 14 extends within a guard 25 such as is usually provided in such constructions; and the lever or beam 16 will take up the well known balancing position within the guard 25 when the hopper 9 is completely empty. As soon as the first increment of material is delivered to the hopper 9, the lever or beam 16 is swung by the excess weight so that its end moves upwardly within the guard 25 to extreme position. A weight 27 on the upper lever or beam 20 may be fixed in adjusted position along the beam by a set screw 28. The right end of the beam 20 extends within a guard 30; and when the load corresponding to the position of the weight 27 is received within the hopper 9, the beam 20 balances in the well known manner.

As is customary with such constructions, weights 32 are adjustably mounted on the levers 16 and 20 adjacent the linkages 14 and 19 by means of screws 33. These weights permit adjustment of the mechanism after it has been calibrated at the factory so as to keep the calibrations correct. An additional weight 35 is mounted, as by being threaded on the outer end of the lever or beam 20, so as to accurately counterbalance the weight of the hopper 9 when empty.

In order to indicate the condition of the hopper as to the load contained therein, a single indicating element is employed, this indicating element being actuated through a floating lever 37 connected through a linkage 38 to the beam 16 and connected through a linkage 39 to the beam 20. A linkage 40 pivoted to the floating lever 37 at 41 transmits cumulatively the movements, due to change in load, of the two beams 16 and 20 to the indicating element. The downward movement of the linkage 40 may, if desired, be cushioned by a dash-pot 42. It will be noted that in this embodiment, the pivot point 41 is intermediate the points on the lever 37 at which connection is made with the linkages 38 and 39. While this is my preferred embodiment, it is obvious that by changing the zero points of the indicator, a different arrangement of pivot points might be used.

The indicator portion of the apparatus is shown on a larger scale in Fig. 2. A movable member 43 is connected by a knife edge connection 44 to the linkage 40 so as to have its position changed by the movements transmitted to it through the linkage 40. In the particular embodiment illustrated, the movable member 43 is an oscillatable member adapted to tilt about the axis 45, being biased in a clockwise direction by the manner in which its weight is balanced. It will be noted that the knife edge connection 44 is to one side of the pivot 45. A pointer 47 is fixed to the member 43 and indicates, in cooperation with a calibrated segment 48, whether the hopper 9 is empty or full, and furthermore, whether the load is precisely the desired load, or is over or under the desired amount.

The mechanism thus far described is useful for indicating to the operator whether he is delivering by means of the hopper 9 the exact amount of material for which the weight 27 has been set. It will be apparent that when the hopper 9 is empty, the weight 35 will carry the end of the beam 20 to its lowermost position. At this time, the beam 16 should be in balancing position; and through the floating lever 37 which is connected both to the beam 16 and to the beam 20, a certain setting of the pointer 47 is effected. At such time, the pointer 47 should be in the position indicated by dotted lines in Figs. 1 and 2. If material is now delivered to the hopper 9, until the beam 20 just balances, the right-hand end of the floating lever 37 is moved upwardly due to movement of the beam 20 to balancing position. Accordingly, the pointer 47 is moved to the right; and if the beam 20 exactly balances, the pointer 47 will be opposite the zero mark as shown in Figs. 1 and 2.

In addition to indicating the load by the pointer 47, my invention contemplates such arrangement of contacts carried by the movable member 43 as to make and break electrical circuits by which operations such as the filling or emptying of the hopper, or locking the filling or discharge mechanisms, or registry at a distance, may be controlled automatically or semi-automatically, when desired. It is preferable to insulate all parts of the circuits from the casing and scale. Certain parts of the indicator may be assembled with insulation inserted in the well known manner to prevent stray currents; and certain parts, such as the member 43, may be made of "bakelite" or other insulating material. A metallic contact rod 50 is adjustably mounted by means of a set screw 51 in an electrically conducting member 52. A similar contact rod 54 is similarly carried in an electrically conducting member 55. The members 52 and 55 are connected together electrically by the rod 56. A depending finger or bracket 59 of insulating material, such as "bakelite", is carried on the rod 56, being fixed in adjusted position by the set screw 62. From a binding post 58 extends an electrical connection including the flexible wire 60, the flexible wire 60 being connected at the axis 45 to a third contact rod 64 carried by the bracket 59. The point of the rod 64 is sufficiently elevated with respect to the point of the contact rod 50 so that the member 43 may swing from the position in which the rod 50 is just contacting to the position in which the rod 64 is just contacting through the same angle as separates the two zeros on the segment 48.

The three contact rods 50, 54 and 64 cooperate with a pair of mercury contacts fixed to the base 65 of the indicator casing. By means of thumb nuts 66, the indicator casing may be leveled and the level of the mercury brought into proper adjustment with respect to the contact rods 50, 54 and 64, bearing in mind that these same thumb nuts will, by proper manipulation, correct the relation of the pointer 47 to the segment 48, should the pointer not properly register with the "empty" and "full" zero marks. The mercury contacts are provided by a pair of cups of mercury, each cup being connected to one of the two binding posts 68 and 69 by wires 70 and 71 as shown in Fig. 4. The mercury cups are preferably formed out of a single block of "bakelite", and the mercury in each cup is preferably connected to its respective wire by a metallic conducting member 73 dipping into the mercury in its respective cup. The contact rods are very thin wires so that in penetrating the mercury in the cups, they offer very little resistance. Moreover, as the contact rods 50 and 54 are merely in contact with the mercury surface when the pointer 47 is opposite the "full" zero, which is when the correct amount of material is contained within the hopper 9, there is no dipping of these rods into the mercury, and hence no interference with the accuracy of measurement of the total amount of material in the hopper 9.

When the hopper 9 is empty and the pointer 47 is at the corresponding zero position, the rod 64 makes contact with its respective mercury cup so that a circuit is completed between the binding posts 58 and 68. At this time, the rod 54 is out of contact with its mercury cup, and there is no current through the wire 71. When the amount of material supplied to the hopper 9 just balances the beam 20, both rods 50 and 54 are in contact with the mercury in their respective cups. If the setting of the mechanism is accurate, the circuit is completed between the binding posts 68 and 69 only if the pointer 47 is opposite zero on the segment 48, which position is indicated in Fig. 2.

The operation is as follows:—When the weighing hopper is empty the pointer 47 is opposite the zero on the left-hand of the indicator, as shown in Fig. 2 if the apparatus is in proper adjustment. At that time the rod 64 just dips into the mercury pot beneath it and closes a circuit. This circuit, through suitable relays, may be used to control other mechanism, such as the opening of a gate, or the starting of a feeding device to fill the hopper with material to be weighed. If, however, the hopper be not entirely empty, lack of contact between the rod 64 and the mercury may prevent the starting of the filling operation, until the hopper has been completely emptied. As the pointer 47 swings to the right from the empty balanced position, the circuit just referred to is opened. Another circuit is established, from mercury cup to mercury cup, when the two rods 50 and 54 both touch the surface of the mercury, which is when the pointer is opposite the zero mark on the right-hand side of Fig. 2. This circuit will be interrupted if the pointer moves either to the right or to the left of the zero mark. Consequently, it may be used readily to release a lock which otherwise prevents the discharge of the hopper, and thus render discharge impossible except when precisely the right quantity has been weighed out.

To put the mechanism into operation, the various counterpoises and other regulating devices of the scale are first adjusted so that when the hopper 9 is empty and the weight 27 at the zero mark on beam 20, both the beams 16 and 20 are in balance and the pointer 47 is at the full zero mark. The weight 27 is then moved to some point along the beam 20 to the right (thereby depressing the beam 20), and the pointer 47 is adjusted so as to come to the empty zero when beam 16 is in balance (there being no material in the hopper at this time). The weight 27 is then set at the predetermined point on the beam 20 corresponding to the weight which it is desired shall constitute a batch of material. The material is then introduced into the weighing hopper, the pointer 47 swinging to the right from the empty zero mark upon the first introduction of material, owing to the upward movement of the scale beam 16 to extreme position. The pointer 47 then remains stationary, both beams being biased to their extreme positions until sufficient material is introduced into the hopper to cause beam 20 to rise. When the weight which causes the beam 20 to balance, as controlled by the setting of the weight 27 at the proper point on the beam 20, has been introduced into the hopper 9, the pointer 47 under the influence of the balancing of the beam 20 reaches the full zero mark, indicating that the proper load has been introduced into the hopper. If there is an excessive load, the beam 20 rises unduly high and the pointer 47 swings to the right of the zero. The emptying of the hopper causes the pointer 47 to return to the empty zero.

My improved construction has the further advantage that the operator need not look in two places to find the readings which indicate the condition of the hopper as to the weight contained therein. There can be no confusion when a green operator is put on the job as to which indicator is to be watched when the hopper is empty and which indicator is to be watched when the material has been poured into the hopper. There is simply one indicator to watch and the two zero marks indicate in a simple manner when the hopper is in proper condition to be either emptied or filled. The construction is such that the indicator element responds to the movements of the two beams of the scale so as to indicate accurately the position of one scale beam when the other is in extreme position and vice versa.

While I have illustrated and described a preferred embodiment of my invention, it will be understood that the same is not restricted to the specific embodiment described, but may be variously modified within the contemplation of the invention and under the scope of the following claims.

I claim:

1. In combination with a scale having two beams, one actuated to balancing position when one load is upon the scale and the other actuated to balancing position when a further predetermined additional load is upon the scale, a single indicating means connected to said scale beams to be moved to one position by the movement to balancing position of the first beam and to be moved to a different position by the cumulative movement of both beams when the second beam is moved to balancing position.

2. In combination with a scale having two beams, one moved to balancing position when one load is upon the scale and to extreme position when additional load is upon the scale and the other moved to balancing position when a further predetermined additional load is upon the scale, indicating means connected jointly to both scale beams to be moved to one predetermined position when the first beam is in balancing position and to be moved to a different predetermined position when the first beam is in extreme position and the second beam is in balancing position.

3. In combination with a scale having two beams, one moved to balancing position when one load is upon the scale and to extreme position when additional load is upon the scale and the other moved to balancing position when a further predetermined additional load is upon the scale, indicating means connected to both scale beams to be moved to one position when only the first beams is in balancing position and to full load position by the movement jointly of both beams.

4. In combination with a scale having two beams, one moved to balancing position when one load is upon the scale and the other moved to balancing position when a further predetermined additional load is upon the scale, indicating means comprising a movable member operatively connected to both beams and moved to one position in response to the movement of the first beam to balancing position, and moved to a different position in response jointly to the movement of both beams.

5. In combination with a scale having two beams actuated to balancing position, each by its respective predetermined load, indicating means and mechanism for actuating said indicating means in response to movement of said scale beams, said mechanism being adapted to position said indicating means in one position in response to the movement of one beam to balancing position, and to position said indicating means in a different position in response to movement of the other beam to balancing position.

6. In combination with a scale having two beams actuated to balancing position, each by its respective predetermined load, indicating means including a floating lever, separate links connecting said lever to the respective beams, and an indicating element connected to said floating lever and movable thereby to one position in response to the movement of one beam to balancing position, and movable to another position in response to the movement of the other beam to balancing position.

7. In combination with a scale having two beams actuated to balancing position, each by its respective predetermined load, indicating means including a floating lever, separate links connecting said lever to said beams respectively, an indicating element, and a link operatively connecting said indicating element to said floating lever, said last-mentioned link being pivoted to said floating lever intermediate said first mentioned links.

8. In combination with a scale having two beams actuated to balancing position, each by its respective predetermined load, indicating means, mechanism operatively connecting said indicating means to said scale beams to move said indicating means to one position by the movement to balancing position of the first beam and to move said indicating means to a different position by cumulative movement of both beams when the second beam is moved to balancing position, said indicating means comprising oscillatable switch mechanism for closing one circuit when the indicating means is in the first mentioned position and for closing a second circuit while breaking the first circuit when in the second mentioned position.

9. In combination with a scale having two beams actuated to balancing position, each by its respective predetermined load, an oscillatable contact member mechanism operatively connecting said member to said scale beams to move said member to one position by the movement to balancing position of the first beam and to move said member to a different position by cumulative movement of both beams when the second beam is moved to balancing position, a pair of mercury contacts and contacts movable with said oscillatable contact member and thereby engageable with said mercury contacts for completing one circuit when the oscillatable contact member is in the first mentioned position and for completing a second circuit while breaking the first circuit when said oscillatable member is in the second mentioned position.

10. In combination with a scale having two beams capable of being moved to balancing position each by its respective predetermined load, mechanism responsive to the load on the scale including a movable member operatively connected to both beams and moved to one position in response to the movement of the first beam to balancing position, and moved to a different position in response jointly to the movement of both beams.

11. In combination with a scale having two beams, each adapted to move from an extreme position to balancing position in response to its respective predetermined load, an indicating element operatively connected jointly to both beams to be moved to one position by and thereby indicate the approximation of one beam to balancing position when the other beam is in an extreme position and to be moved to a different position by and thereby indicate the approximation of the other beam to balancing position.

12. In combination with a scale having two beams capable of being moved to balancing position each by its respective predetermined load, mechanism responsive to the load on the scale and operatively connected to both beams including a movable member moved to one position by the movement to balancing position of one beam and moved to a different position by the movement of the other beam to balancing position, a pair of mercury contacts and a pair of movable contacts carried by said member and cooperating with said mercury contacts at but a single position of said movable member to complete a circuit including said contacts.

13. In combination with a scale having two beams actuated to balancing position each by its respective predetermined load, an oscillatable contact member mechanism operatively connecting said member to said scale beams to move said member to one position by the movement to balancing position of the first beam and to move said member to a different position by cumulative movement of both beams when the second beam is moved to balancing position, a pair of mercury contacts, a contact carried by said oscillatable contact member for cooperating with one of said mercury contacts to complete a circuit when the first beam is moved to balancing position, and a pair of movable contacts carried by said oscillatable contact member for cooperating with said mercury contacts to complete another circuit only when the second beam is moved to accurate balancing position.

14. In combination with a scale having two beams each adapted to move from either of two extreme positions to balancing position in response to its respective predetermined load, mechanism responsive to the load on the scale and operatively connected to both beams including a movable member moved to one position by the movement to balancing position of one of the beams and moved to a different position by cumulative movement of both beams when the other beam is moved to balancing position, a pair of mercury contacts, and a pair of contacts carried by said movable member and cooperating with said mercury contacts to complete a circuit only when the first beam is in accurate balancing position and the other beam is in an extreme position.

HAROLD E. McCRERY.